(12) United States Patent
Abdellatif et al.

(10) Patent No.: US 11,761,758 B2
(45) Date of Patent: *Sep. 19, 2023

(54) MAGNETICALLY COUPLED INTEGRATED ULTRASONIC TESTING AND CATHODIC PROTECTION MEASUREMENT PROBE

(71) Applicant: Saudi Arabian Oil Company, Dhahran (SA)

(72) Inventors: Fadi Abdellatif, Thuwal (SA); Ayman Amer, Thuwal (SA); Ali Outa, Gilching (DE); Sahejad Patel, Thuwal (SA); Abdullah Arab, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 308 days.

This patent is subject to a terminal disclaimer.

(21) Appl. No.: 17/214,070

(22) Filed: Mar. 26, 2021

(65) Prior Publication Data

US 2021/0239465 A1    Aug. 5, 2021

Related U.S. Application Data

(62) Division of application No. 15/685,807, filed on Aug. 24, 2017, now Pat. No. 10,989,529.

(Continued)

(51) Int. Cl.
   *G01B 17/02*     (2006.01)
   *G01N 29/07*     (2006.01)
   (Continued)

(52) U.S. Cl.
   CPC ............. *G01B 17/02* (2013.01); *B63G 8/001* (2013.01); *C23F 13/22* (2013.01); *G01N 29/07* (2013.01);
   (Continued)

(58) Field of Classification Search
   CPC .......... G01B 17/02; B63G 8/001; C23F 13/22; C23F 13/04; C23F 2213/31; G01N 29/07;
   (Continued)

(56) References Cited

U.S. PATENT DOCUMENTS 4,027,349 A    6/1977  Clavin
6,317,387 B1 * 11/2001  D'Amaddio ........... G01N 29/11
                                                367/129
(Continued)

FOREIGN PATENT DOCUMENTS

WO       2015118326 A1    8/2015
WO    WO-2015118326 A1 *  8/2015   ............. G01D 11/30

OTHER PUBLICATIONS

Cygnus Instruments, "Cygnus W1 Work Class ROV Probe Handler", Data sheet, DS101 Iss. 6, Jun. 2014 (Year: 2014).*

(Continued)

*Primary Examiner* — Marrit Eyassu
(74) *Attorney, Agent, or Firm* — Leason Ellis LLP (57) ABSTRACT

This application discloses magnetically coupled integrated probes and probe systems, attachable to the robotic arms of a remotely operated vehicle to perform both cathodic protection (CP) voltage measurements and ultrasonic testing (UT) thickness measurements at an underwater surface. The integrated probe system can include a spring for coupling to an ROV end effector. An ultrasonic probe is disposed within and extends from the sleeve housing. A magnetic carrier, flux concentrator, and gimbal surround a portion of the ultrasonic probe, and one or more electrically conductive legs extend from the front surface of the gimbal to function as a CP probe. The legs are arranged about the ultrasonic probe, which has a flexible membrane exposed at the front surface of the gimbal, such that during inspection, at least one leg contacts the surface and the ultrasonic probe is (Continued)

sufficiently proximate to provide substantially simultaneous CP and UT measurements.

8 Claims, 7 Drawing Sheets

Related U.S. Application Data (60) Provisional application No. 62/395,109, filed on Sep. 15, 2016.

(51) Int. Cl.

| | | |
|---|---|---|
| *G01N 29/28* | (2006.01) | |
| *G01N 29/265* | (2006.01) | |
| *G10K 11/00* | (2006.01) | |
| *G01N 29/22* | (2006.01) | |
| *B63G 8/00* | (2006.01) | |
| *C23F 13/22* | (2006.01) | |
| *C23F 13/04* | (2006.01) | |

(52) U.S. Cl.
CPC ......... *G01N 29/223* (2013.01); *G01N 29/265* (2013.01); *G01N 29/28* (2013.01); *G10K 11/006* (2013.01); *C23F 13/04* (2013.01); *C23F 2213/31* (2013.01); *G01N 2291/02854* (2013.01); *G01N 2291/101* (2013.01); *G01N 2291/2634* (2013.01)

(58) Field of Classification Search
CPC .... G01N 29/223; G01N 29/265; G01N 29/28; G01N 2291/02854; G01N 2291/101; G01N 2291/2634; G10K 11/006; B23Q 1/5406; G01K 11/006
USPC ......................................................... 73/1.82
See application file for complete search history.

(56) References Cited

U.S. PATENT DOCUMENTS

| | | | |
|---|---|---|---|
| 10,345,221 B1* | 7/2019 | Silverman | G01N 29/28 |
| 2006/0266123 A1* | 11/2006 | Georgeson | G01N 29/043 |
| | | | 73/634 |
| 2011/0259108 A1* | 10/2011 | Ege | G01N 29/2412 |
| | | | 73/643 |
| 2014/0076053 A1 | 3/2014 | Gaudet et al. | |
| 2015/0078953 A1 | 3/2015 | Otomo | |
| 2016/0001857 A1 | 1/2016 | Ledda et al. | |
| 2016/0264223 A1 | 9/2016 | Ferguson et al. | |
| 2017/0067736 A1 | 3/2017 | Silverman | |

OTHER PUBLICATIONS

"Leopard" Saab Seaeye, http://www.seaeye.com/leopard.html, Archived Aug. 16, 2016. 8 pages.

"Cygnus G1 Probe Handler" Cygnus Instruments,http://www.cygnus-instruments.com/probe-handlers/g1/. Archived Aug. 23, 2016. 8 pages.

"DigiCP Digital Cathodic Potential Measurement System" OceanTools, http://www.oceantools.co.uk/rov/digicp-digital-cp-probe/. Archived Mar. 17, 2016. 2 pages.

VideoRayThickness Gauge http://www.videoray.com/homepage/new/options/thickness-gauge.html, Archived Aug. 2, 2016. 3 pages.

Cygnus S1 Probe Handler for ROV Ship Hull Inspection Cygnus Instruments. Data Sheet DS109 Iss. 2 Apr. 2011 (2011). 1 page.

Cygnus Instruments Inc.: "Cygnus W1 Work Class ROV Probe Handler", https://www.cygnus-instruments.com/wp-content/uploads/2017/05/cygnus-probe-hander-w1-data-sheet.pdf. 1 page, Jun. 2014.

Cygnus Instruments Inc. "Cygnus ROV Mountable—Cygnus Instruments." Retrieved from the Internet: url: https://web.archive.org/web/20160727014847/http://www.cygnus-instruments.com:80/thickness-gauge-underwater/rov-mountable/, Jul. 26, 2016.

Robert D. Christ et al., "The ROV Manual." https://www.cygnus-instruments.com/wp-content/uploads/2017/03/cygnus-probe-handlers-sl-data-sheet.pdf. Jan. 1, 2014.

Singapore Written Opinion in Corresponding Singapore Application No. 11201901009W dated Jun. 15, 2020. 6 pages.

Examination Report in Corresponding Gulf Coast Application No. 2017-33972 dated Apr. 2, 2020. 4 pages.

International Search Report and Written Opinion in Corresponding PCT Application No. PCT/US2017/050725 dated Jan. 3, 2018. 41 pages.

Office Action in corresponding KR Application No. 10-2019-7002339, dated Mar. 12, 2022.; 11 pages.

\* cited by examiner

MAGNETICALLY COUPLED INTEGRATED ULTRASONIC TESTING AND CATHODIC PROTECTION MEASUREMENT PROBE

CROSS-REFERENCE TO RELATED APPLICATIONS

The present application is a divisional of U.S. patent application Ser. No. 15/685,807, filed Aug. 24, 2017, which claims the benefit of U.S. Provisional Patent No. 62/395,109, filed Sep. 15, 2016, the contents of all of which are hereby incorporated by reference in their respective entireties.

FIELD OF THE INVENTION

This patent application generally relates to testing and measuring mechanisms, and more particularly to probe systems for ultrasonically measuring thickness and performing cathodic protection voltage readings in an underwater environment.

BACKGROUND

In order to non-destructively measure the thickness of a structure, one common practice is to have a measuring device emit ultrasonic waves at the surface of the structure and to measure the time it takes for the ultrasonic wave to return to the measuring device. Ultrasonic testing ("UT") is applicable for measuring the thickness of metal structures, such as underwater structures like boat hulls, pilings, pipelines, and risers. In order to limit corrosive effects to such underwater surfaces, the technique of cathodic protection ("CP") is applied. In CP, the metal surface of the underwater structure is made into a cathode of an electrochemical cell (e.g., a Galvanic cell) and the surface is coated with another metal having a greater negative electrode potential (e.g., zinc, magnesium, aluminum) that functions as an anode. Then, the anodic metal corrodes, but the structure surface does not. To ensure that CP is working as intended, it is common to measure the voltage at the surface of the structure. Typically, for underwater structures, a remotely operated vehicle ("ROV") or human diver is used to perform CP and UT measurements. In either case, due to load and logistical limitations inherent with conventional ROVs, CP and UT measurements are performed by two probes at separate ROV robotic arms or by exchanging one probe for another at a single arm. In either case, the switching or readjusting of probes to perform repeated CP and/or UT measurements is time consuming and costly. Additionally, due to the weight of conventional CP and UT probe systems and the need for a two-armed ROV system, only larger Work-Class ROVs are capable of attaching two arms to alternatingly perform both measurements in a single trip. However, Work-Class ROVs are unsuitable for shallow and limited accessibility (e.g., surfaces within small cavities) inspection sites. Thus, there is a need for an integrated CP and UT probe system that can be coupled to smaller and lighter ROVs having only a single robotic arm.

Furthermore, during CP and UT measurement, when conventional CP and UT probe systems contact the underwater inspection surface, a recoil force is created that pushes the probe system away from the surface. As ROVs float underwater, they are particularly susceptible to recoil forces, which can disorient the probe system or disengage the probe system from the inspection surface. Reorienting the system requires ROV thruster operation, which adds delay to each measurement that appreciably accumulates, particularly if many measurements are to be made.

It is in regard to these issues that the present application is provided.

SUMMARY OF THE INVENTION

According to a broad aspect of the invention, magnetically coupled integrated probe systems are provided that can substantially simultaneously perform both cathodic protection (CP) voltage readings and ultrasonic testing (UT) thickness measurements.

In accordance with one aspect of the invention, embodiments of the magnetically coupled integrated probe systems include a probe carrier, in which an electrically conductive portion is disposed at a front surface of the probe carrier, the front surface defining a cavity centrally therein. The electrically conductive portion can include conductive tips or a serrated rim in various embodiments. One or more magnets and a flux concentrator are embedded within the probe carrier, in which the flux concentrator is supported by the one or more magnets and adjacent to the electrically conductive portion of the probe carrier. In some embodiments, the flux concentrator is a ring-shaped layer of magnetically conductive material. In other embodiments, the flux concentrator includes one or more magnetically conductive rods embedded within the probe carrier.

Continuing with this aspect of the invention, the integrated probe systems additionally include a flexible membrane seated in the cavity of the probe carrier. In one or more embodiments, two or more electrically conductive tips extend longitudinally away from the front surface of the probe carrier and are arranged equidistant from one another about the flexible membrane. Further, the integrated probe systems according to one or more embodiments include a sleeve housing and an ultrasonic probe having a transducer crystal, the ultrasonic probe being partially disposed within the sleeve housing and extending through the probe carrier to be adjacent to the flexible membrane, the flexible membrane being arranged about the transducer crystal. A couplant can be disposed within a gap between the flexible membrane and the transducer crystal. In one or more embodiments, the integrated probe system includes a spring coupled to a free end of the sleeve housing and configured to provide two degrees of freedom to the probe carrier in response to a force imparted when the probe carrier contacts the underwater surface In another aspect of the invention, embodiments of the magnetically coupled integrated probe system include an outer gimbal shaped as a hollow ring and having one or more coupling points disposed at the inner surface of the outer gimbal. An inner gimbal is coupled to the outer gimbal at the one or more coupling points, the inner gimbal having an electrically conductive portion disposed at a front surface of the inner gimbal, and the front surface defining a cavity centrally therein. In one or more embodiments, the outer gimbal and the inner gimbal are coupled to provide one or more degrees of freedom of movement to the inner gimbal. One or more magnets and a flux concentrator are embedded within the inner gimbal, in which the flux concentrator is supported by the one or more magnets, and adjacent to the electrically conductive portion.

Continuing with this aspect of the invention, the integrated probe systems additionally include a flexible membrane seated in the cavity of the inner gimbal. In one or more embodiments, two or more electrically conductive tips extend longitudinally away from the front surface of the outer gimbal or the inner gimbal and are arranged equidistant from one another about the flexible membrane. In one or more embodiments, the inner gimbal is sized and shaped to define one or more ingresses, and at least one of the electrically conductive tips is disposed on the outer gimbal and extends longitudinally through the one or more ingresses. Additionally, the integrated probe systems herein include a modular frame coupled to an outer surface of the outer gimbal. Further, the integrated probe systems according to one or more embodiments include a sleeve housing and an ultrasonic probe having a transducer crystal, the ultrasonic probe being partially disposed within the sleeve housing and extending through the inner gimbal to be adjacent to the flexible membrane, the flexible membrane being arranged about the transducer crystal. A couplant can be disposed within a gap between the flexible membrane and the transducer crystal.

BRIEF DESCRIPTION OF THE DRAWINGS

The accompanying drawing figures illustrate exemplary embodiments and are not intended to be limiting of the invention. Among the drawing figures, like references are intended to refer to like or corresponding parts.

DETAILED DESCRIPTION OF CERTAIN EMBODIMENTS OF THE INVENTION

The invention is now described with reference to the accompanying drawings, which form a part hereof, and which show, by way of illustration, example implementations and/or embodiments of the present invention. It is to be understood that other embodiments can be implemented and structural changes can be made without departing from the spirit of the present invention. Among other things, for example, the disclosed subject matter can be embodied as methods, devices, components, or systems.

Furthermore, it is recognized that terms may have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

In accordance with the present application, embodiments are provided that are directed to magnetically coupled integrated probes and integrated probe systems for measuring cathodic protection (CP) voltage and measuring surface thickness using ultrasonic testing (UT) in which the delay between taking each measurement is minimized. In this way, CP and UT measurements can be performed substantially simultaneously. For example, both CP and UT measurements can be performed during a single touchdown at a specific underwater surface (or an "inspection surface"), such as an underwater pipeline or piling, or the underside of a moored ship hull.

During touchdown, in order to counteract the recoil force created by contact between the integrated probe and the inspection surface, the integrated probe systems include magnetic adhesion components that serve to magnetically couple the integrated probe to the inspection surface. Typical inspection surfaces, such as pipelines, comprise ferromagnetic materials (e.g., iron, cobalt, steel, or nickel) or include cathodic protection coating (e.g., zinc, magnesium, aluminum) that is made electromagnetically receptive by connecting the surface to a sufficient current.

In one aspect, the integrated probes as provided in one or more embodiments herein can be coupled to a single robotic arm of a remotely operated vehicle (ROV) at, for example, the free end of an arm-end effector. The structural limitations of typical ROVs restrict their robotic arms to only a single interchangeable or permanently mounted probe per robotic arm, and such arms lack the dexterity necessary to perform simultaneous CP and UT measurements. Thus, conventionally, in order for a ROV to perform both CP and UT measurements in a single trip, it must have at least two robotic arms. Each robotic arm is heavy, and only large, work-class ROVs can include two or more robotic arms. In some cases, conventional measurement methods require a complete probe exchange (e.g., from CP to UT, or vice versa) at the arm to perform the second measurement. Such limited actuation capabilities result in inherent delay (and thus increased costs due to necessarily increased ROV time) because the two probe measurement systems must switch between two wholly separate CP and UT probes, and must reorient the second probe to the same inspection surface where the first probe measurement was taken. The present application does not require the implementation of two separate CP and UT probes or probe systems by separate robotic arms of a ROV or by requiring the exchange of probe attachments.

Further, the integrated probe systems herein provide the advantage of being implementable by small, lightweight class ROVs having only a single robotic arm, such as electric ROVs, general class ROVs, inspection class ROVs, and observation class ROVs. Smaller class ROVs are advantageously deployable for inspection surfaces having accessibility issues (e.g., shallow water sites), or if there are power supply limitations.

As ROVs float in water, continuous thruster operation is necessary to compensate for recoil forces resulting from surface contact in order to maintain probe orientation toward the underwater surface during inspection. In one aspect of the present application, magnetic coupling adheres the integrated probe to the inspection surface, thereby avoiding recoil force effects. This provides the advantage of zero-power continuous attachment of the ROV to inspection surface (i.e., without needing continuous thruster operation).

In one or more embodiments, the integrated probe system includes a central UT probe (e.g., a piezo-ceramic transducer crystal) and an array of electrically conductive legs having tips or fixtures that are articulated and passively adjustable that surround the UT probe. The electrically conductive legs are not rigid, but rather have some flexibility with respect to how they contact an underwater surface. In this way, when the electrically conductive legs contact an underwater surface, they passively adjust to orient the UT sensor transverse to the inspection surface. At the same time, the legs conduct electrical voltage associated with the cathodically protected surface, such as by electrically conductive steel tips, to act as a CP probe. For both CP and UT measurements, magnetic components in the integrated probe system assist in orienting the CP and UT probes by guiding such legs into contact with an inspection surface. In this way, CP and UT measurements can be conducted substantially simultaneously, thereby reducing measurement inspection time, reducing the size and weight added to the robotic arm, and improving ROV agility.

It is important to note that as disclosed herein, in one or more embodiments, the integrated probe system is a direct measurement system, meaning that the integrated probe system contacts the surface to be measured. Underwater CP and UT measurements present particular challenges not present in CP or UT measurements taken above ground or buried in earth, such as accurately performing electrical measurements in a liquid environment. The integrated probe systems disclosed herein are configured for underwater structure measuring, and overcome these challenges via direct measurement. In this way, the integrated probe systems disclosed herein do not need to implement sacrificial coupons or the like for inferring a CP or UT measurement. Further, the integrated probe systems of the present disclosure are not configured to corrode as a means of determining CP or UT. Rather, the CP probe directly contacts the structure's cathodic protection system, and is configured to account for electrical interference generated at the measurement surface. Additionally, advantageously, direct measurements as by the present integrated probe systems herein are suitable for conventionally designed ROV attachment arms, which are designed for the attachment devices that contact subsea structures directly, rather than from a distance.

Figure 1A:
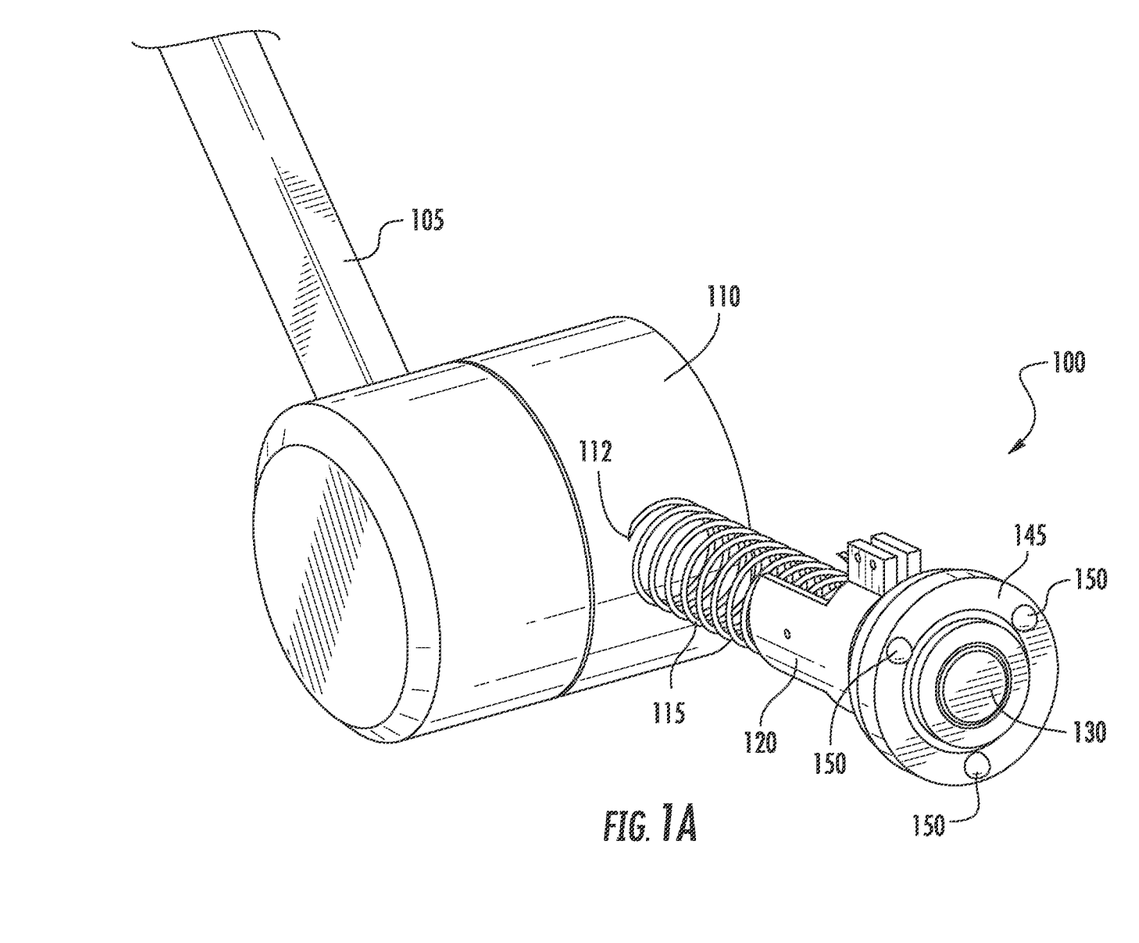
FIG. 1A illustrates a perspective view of a magnetically coupled integrated CP and UT probe system in accordance with at least one embodiment of the present application.
Figure 1B:
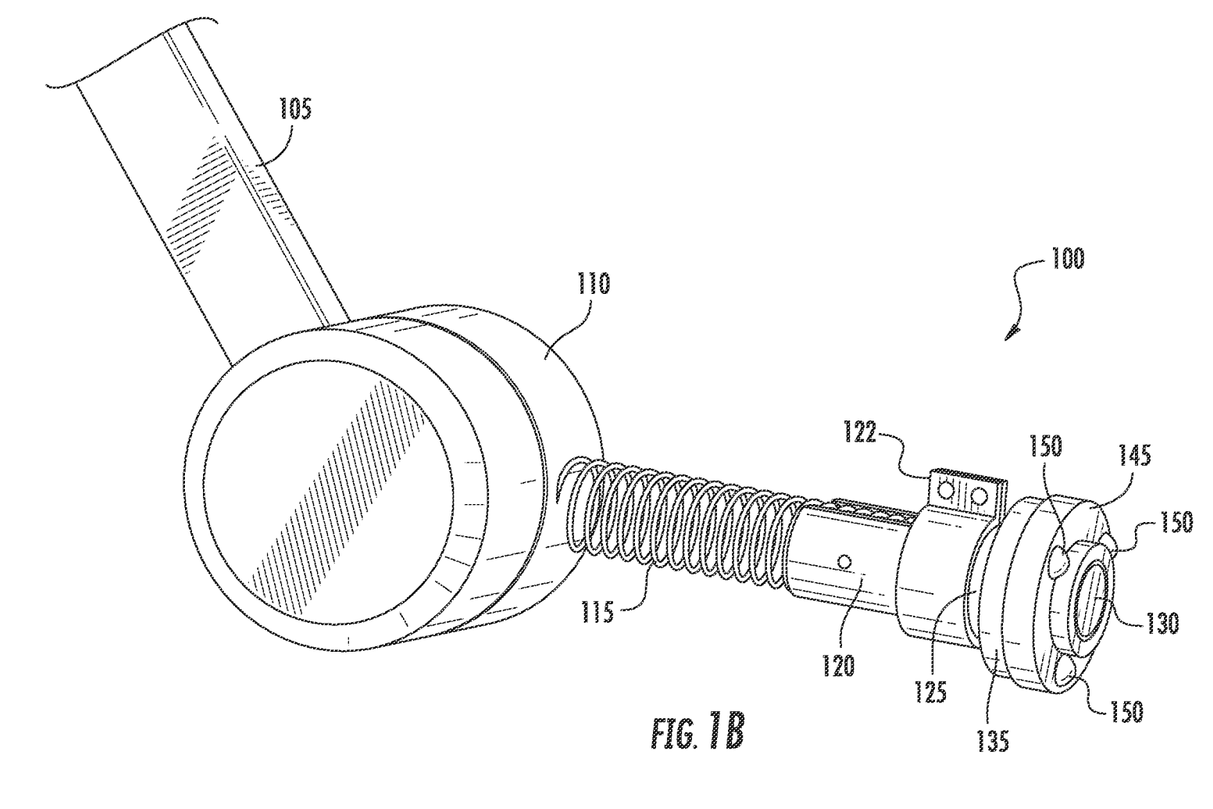
FIG. 1B illustrates an isometric side view of the magnetically coupled integrated CP and UT probe system of FIG. 1A.
Figure 1C:
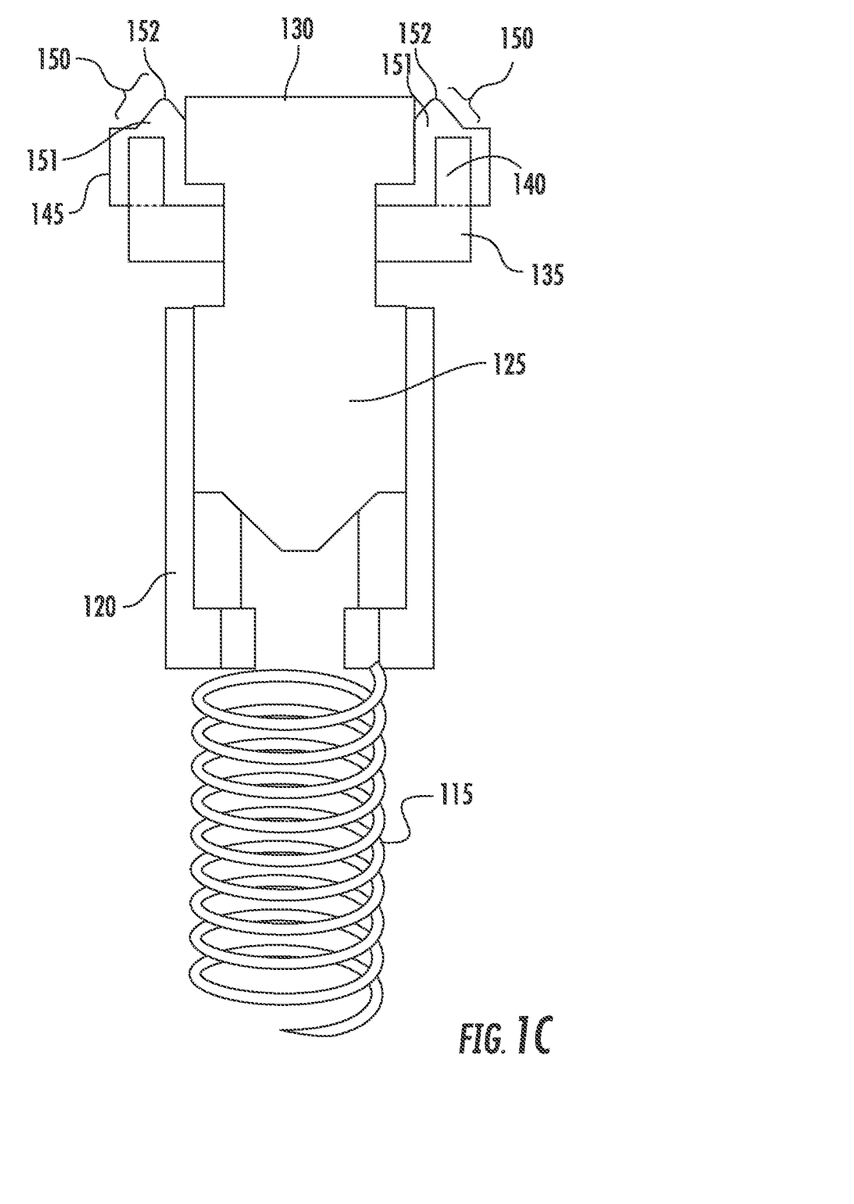
FIG. 1C illustrates a top cutaway view of the magnetically coupled integrated CP and UT probe system of FIG. 1A.

With reference now to FIGS. 1A-1C, a magnetically coupled integrated CP and UT probe system 100 in accordance with at least one embodiment of the present application is provided. Integrated probe system 100 is designed to be coupled to a remotely operated vehicle (ROV) (not shown) having at least one robotic measuring arm 105. The robotic arm 105 includes an end effector 110 at the free end of the robotic arm. In one or more embodiments, the end effector 110 is freely rotatable (e.g., 360 degrees) and includes one or more probe attachment points for coupling various probe attachments. A motor (not shown) is housed within or mounted to the robotic arm 105 or end effector 110 for rotating the attachment points, and in turn, the integrated probe system 100, into desired positions. For example, the motor can be housed within the tip of the robotic arm 105 and be in mechanical connection with the end effector 110, as is known in the art. By actuating the motor and thereby rotating the end effector 110, the sensor facing the inspection surface can be oriented. The attachment points can include modular frames that the probe attachment screws or snaps into, or include points for direct fixation to the end effector via a screw and threaded sleeve. Other similar attachment mechanisms can be used, as is known in the art.

The end effector 110 of the exemplary embodiment in FIGS. 1A-1C includes a single attachment point 112 at the outer circumference of the end effector for coupling the integrated probe system 100. In this embodiment, a spring 115 couples to the attachment point 112 at one end and couples to a rear end of a sleeve housing 120 at the other end. A spring is selected to couple the integrated probe system 100 to the end effector because its flexibility provides one or more degrees of freedom to the integrated probe system due in part to the restoring moment that springs offer. Further, the flexibility of spring 115 provides a range of motion for orienting the integrated probe system 100 in the event of a misalignment of the system and the inspection surface, such range of motion being determined by spring stiffness. A more stiff spring provides a smaller range of motion, whereas a less stiff spring having greater flexibility provides a relatively larger range of motion. In the exemplary embodiment, the spring 115 is configured to provide two degrees of freedom for the integrated probe 100, namely to pitch up and down around an axis perpendicular to the longitudinal axis of spring 115 at rest (the "pitch plane") and to yaw left and right around the vertical axis defined by a plane perpendicular to the longitudinal axis of spring 115 (the "yaw plane").

The sleeve housing 120 is a hollow, cylindrically-shaped tube that extends longitudinally from the second end of the spring 115. In one or more embodiments, the inner surface of sleeve housing 120 includes grooves or slots for the end coil of spring 115 to couple to. In other embodiments, the spring 115 is adhered to the inner surface of the sleeve housing by epoxy, glue, fasteners, nuts and bolts, or screwed in. In a particular embodiment, the sleeve housing 120 includes one or more upstanding ears 122 adapted to receive binding screws to secure the sleeve housing around the spring 115 and/or other components. The sleeve housing 120 can be open to the elements at certain points, as shown in FIGS. 1A-1C, or can be a fully enclosed cylinder.

The ultrasonic testing thickness measurement capabilities of integrated probe system 100 are provided by an ultrasonic probe 125 and a flexible membrane 130 when brought into proximity to the inspection surface. In one or more embodiments, the ultrasonic probe 125 includes a housing that surrounds an active ultrasonic element that emits and receives ultrasonic waves at a particular frequency. For example, the ultrasonic element can be a piezo-electric (or "transducer") crystal operating at frequencies of 2.0 MHz, 2.25 MHz, 3.5 MHz, 5.0 MHz, or 7.5 MHz. As the ultrasonic probe 125 emits and receives ultrasonic waves, a signal corresponding to the measurements is transferred to a signal processor (at the ROV or above-surface) configured to convert the signal into a surface thickness measurement. The signal can be transferred by a cable housed within the ultrasonic probe 125 that is in mechanical connection with the ROV or by wireless transmission.

As illustrated by FIG. 1C, the ultrasonic probe 125 is partially housed within the sleeve housing 120 and extends toward an inspecting end of the probe. The inspecting end of ultrasonic probe 125 defines a cavity at the front surface at which the flexible membrane 130 is adjacent to and spaced from the ultrasonic element, thereby defining a gap therebetween that is filled with couplant to facilitate ultrasonic transmission. For example, the membrane couplant can be propylene glycol, glycerin, silicone oil, or various commercially available gels, viscous liquids or pastes. In one embodiment, the flexible membrane 130 is made of latex rubber. In one or more embodiments, additional sensor housing surrounds and is coupled to the flexible membrane 130 at the inspection end of the ultrasonic probe 125. For example, the flexible membrane 130 can be fitted into a knurled ring made of stainless steel to protect the ultrasonic element while still permitting the ultrasonic element to perform measurements via the flexible membrane.

The membrane 130 can be connected to ultrasonic probe 125 in various ways. For example, in response to manual urging, the membrane 130 can flex into a biased state with a reduced profile (e.g., a compression) in order to pass into a mouth or cavity defined by the ultrasonic probe 125, and upon release of the applied force at the membrane, the membrane restores to an unbiased state in which lips formed at the edges of the membrane engage with the interior of the housing and also engage with the exterior surface of the ultrasonic probe. In one or more embodiments, the lips of the membrane 130 are sized and shaped to interlock with seats or grooves formed on the interior of the ultrasonic probe 125. Depending on the resistance of the flexible membrane 130 to compression, in the unstable compressed state, the free ends will urge a greater or lesser amount toward the unbiased state. When attached to the interior of the front surface cavity of ultrasonic probe 125, this urging creates friction between the inner walls of the housing and the ultrasonic probe, which prevents the flexible membrane 130 from sliding longitudinally along the ultrasonic probe housing interior once coupled. This friction remains because the flexible membrane 130 is unable to fully return to its unbiased state while positioned within the groove or seat between the housing of ultrasonic probe 125, while the elastic restoring force continually applies pressure on the side walls of the groove.

To facilitate orienting the integrated probe system 100 to the inspection surface, the present application includes magnetic arrangements disposed at or below the front surface of the integrated probe system 100. In one or more embodiments, the magnetic arrangements are implanted in a CP probe carrier structure that surrounds the ultrasonic probe 125 near the ultrasonic element and flexible membrane 130. The probe carrier surrounding the magnetic arrangement can be formed of pivotable gimbals, integrally formed steel rings, magnets, magnetic conductors, or similar structure suitable for magnetic and flux concentrating materials to be embedded within.

In the exemplary embodiment of FIGS. 1A-1C, the probe carrier includes a magnetic carrier 135, one or more magnetic flux concentrators 140, and a surface gimbal 145 designed to orient to an inspection surface, which are coupled together in sequence or integrally formed as a single structure. The magnetic carrier 135 includes material that is permanently magnetic (e.g., an embedded magnet composed of iron, cobalt, nickel, rare earth metals, metallic alloys, etc.) and supports one or more magnetic flux concentrators 140 designed to conduct magnetic flux generated by the magnetic carrier nearer to the gimbal 145, which is seated above the flux concentrator and magnetic carrier as illustrated by FIG. 1C. In one or more embodiments, the flux concentrator 140 comprises a ring-shaped layer of magnetically conductive material disposed between the magnetic carrier 135 and gimbal 145. In other embodiments, the flux concentrator 140 comprises one or more magnetically conductive rods embedded within the gimbal 145 below conductive CP probe contact points (e.g., tips 152, described below). In the exemplary embodiment, the magnetic carrier 135, magnetic flux concentrator 140, and gimbal 145 are ring shaped. The probe carrier components can be shaped in other ways as well, such as being square, rectangular, or triangular-shaped and defining an aperture therethrough for the ultrasonic probe 125 to pass through, depending on the desired arrangement. In one or more embodiments, the magnetic carrier 135 and the flux concentrator 140 are a single magnetic structure. The magnetic material comprising magnetic carrier 135 and flux concentrator 140 can include iron, nickel, cobalt, and alloys thereof such as alnico, ferrite, or similar materials for creating magnetic flux, as is known in the art. In one or more embodiments, the magnetic carrier 135 is a conventional permanent magnet and the flux concentrator 140 is machine-fashioned and composed of iron such that it channels magnetic flux created by the magnetic carrier 135 to the surface of the gimbal 145. In this way, as the integrated probe system 100 is brought into proximity with the inspection surface, the magnetic flux generated by magnetic carrier 135 and/or flux concentrator 140 serves to provide stable adhesion to the inspection surface by the gimbal 145 during measurement acquisition.

Integrated probe system 100 includes electrically conductive material disposed at the gimbal 145 that serves to conduct voltage at the inspection surface and thereby perform cathodic protection (CP) voltage measurements. For example, the electrically conductive material can be made of stainless steel. In one or more embodiments, one or more electrically conductive legs 150 extend longitudinally from the front surface of the gimbal 145 to serve as CP probes for the integrated probe system 100. Legs 150 can be integrally formed with the gimbal 145, or can be interchangeable cathodic probes that are fitted into grooves sized and shaped to receive such legs. In either case, the legs are articulated— i.e., connected to allow flexibility of movement. In one or more embodiments, the legs 150 include a subsea housing 151 that contains one or more reference cells within (or "reference electrodes"), and a conductive tip 152 (or "voltage electrode") at the end of the housing. In one or more embodiments, the conductive tips 152 are exchangeable and the subsea housing 151 is integrally formed with gimbal 145. In other embodiments, both the subsea housing 151 and the conductive tips 152 are exchangeable. The reference cell housed in the subsea housing 151 must be exposed to water and can be of the type used in conventional cathodic protection potential probe construction, such as a silver/silver chloride half-cell or a pure zinc electrode. The conductive tips 152 are made of conductive metals, such as steel or other alloys that can conduct voltage at the underwater surface to be measured.

The electrically conductive legs 150 are in electrical connection with a voltage processing device, such as a voltmeter (not shown), which can be located at the integrated probe system 100, an ROV, or surface-side in order to record and/or display voltage readings taken at a measurement site. In embodiments implementing an ROV, the ROV can have an umbilical cable leading to an above-surface location to couple, by an electrical cable, a voltmeter to the non-tip end of the legs 150, such that when the conductive tip 152 contacts the underwater surface (e.g., a pipeline), the potential is measured by the voltmeter. At least one voltage electrode at one of the tips 152 of legs 150 must be in contact with the inspection surface to obtain an accurate cathodic potential reading, but it is not necessary that each leg 150 be in contact with the inspection surface when the reading is made. The present application does not suffer from inaccurate readings due to various resistive paths presented by each leg 150 during voltage reading.

In one or more embodiments, the tips 152 of legs 150 are shaped as cones having circular or elliptical bases. In other embodiments, the tips 152 of legs 150 are pyramid shaped, rectangular prisms, semicircular, pointed, flat, or have rounded ends. In this way, the tips 152 are re-configurable or interchangeable to achieve various contact configurations. For example, the tips 152 can be mobile metallic rollers, wheeled tips or ball casters instead of static stainless steel tips. Such a configuration will reduce impact on a ROV arm end effector upon touchdown at an inspection surface (e.g., a steel surface of a pipe) and allow for translational motion across the inspection surface when performing scans instead of spot checks.

In one or more embodiments, the flux concentrator 140 is embedded directly below the surface portion of the gimbal 145 that the electrically conductive legs 150 extend from. In other embodiments, the flux concentrator 140 is embedded within the legs 150. In this way, the magnetic flux generated by the magnetic carrier 135 and/or the flux concentrator 140 are positioned to adhere the integrated probe system 100 to the inspection surface when the tips 152 make contact. In the particular exemplary embodiment illustrated by FIGS. 1A-1C, three electrically conductive legs 150 are arranged equidistant from one another and from the flexible membrane 130. In this particular arrangement, during measurement, one of the legs 150 contacts the inspection surface and the magnetic flux generated by the flux concentrator 140 embedded below it causes that leg to adhere to the surface. The integrated probe system 100 has freedom of movement provided by spring 115 and is guided by the magnetic flux that is below each of the tips to orient the remaining legs 150 transverse to the inspection surface. Because the three legs 150 are oriented equidistant from one another around the flexible membrane 130, the ultrasonic probe 125 is then directed at approximately the same inspection spot where the legs have contacted. Since both the ultrasonic probe 125 and the legs 150 (acting as a CP probe) are all then oriented at substantially the same inspection surface, simultaneous measurement of both CP voltage and UT thickness can be performed.

During operation of integrated probe system 100, in order to perform both CP and UT measurements substantially simultaneously, both the CP and UT aspects of the integrated probe system need to be brought into proximity to the inspection surface, as described above. Sufficient proximity is dependent upon the calibration of the ultrasonic probe 125, meaning that the ultrasonic probe has a certain measurement effectiveness range as a result of the properties of the water that is situated between the integrated probe and the surface, the materials of the surface, and other considerations. For example, the ultrasonic probe 125 typically needs to abut or be within a few millimeters of the inspection surface to perform a successful measurement. The further that the ultrasonic probe 125 is from the inspection surface, the less accurate that the UT measurement is. However, the electrically conductive legs 150 must also contact the inspection surface in order to take a CP voltage measurement. To this end, in one or more embodiments, the legs 150 and flexible membrane 130 adjacent to the ultrasonic probe are approximately level. In this way, when the integrated probe system 100 is brought in proximity to the inspection surface, one or more of the legs 150 will contact the surface, and the ultrasonic probe 125 will be close enough to the surface to perform accurate UT measurements. In other embodiments, in which the range of the ultrasonic probe 125 is greater, the legs 150 can extend 0-5 mm, 0-10 mm, 0-15 mm, or 0-20 mm beyond the front surface of integrated probe system 100.

The decision of whether and how much the legs 150 extend beyond the flexible membrane 130 and where to arrange the legs at the front surface of the integrated probe system 100 can be dependent upon the particular arrangement desired. For example, the legs 150 can be advantageously arranged around a flexible membrane 130 centrally located at the front surface of ultrasonic probe 125, such that each leg 150 is equidistant from both one another and active ultrasonic element within the ultrasonic probe. Centrally locating the flexible membrane 130 in this way maximizes the likelihood that a UT thickness measurement is performed as one or more of the legs 150 contacts an inspection surface. The distance that the legs 150 are from the flexible membrane 130 can be varied, depending on the arrangement desired to inspect a particular surface. For example, an arrangement in which the legs 150 are near to the flexible membrane 130 decreases any differences in measurement lag between taking a CP voltage and UT thickness measurement and increases the precision of the spot inspection, whereas spacing the legs 150 relatively further from the sensor housing provides a wider inspection area and can provide an alignment assist (i.e., there is a greater chance that at least one leg will contact the inspection surface and cause the other legs to orient transverse to the inspection surface).

Figure 2A:
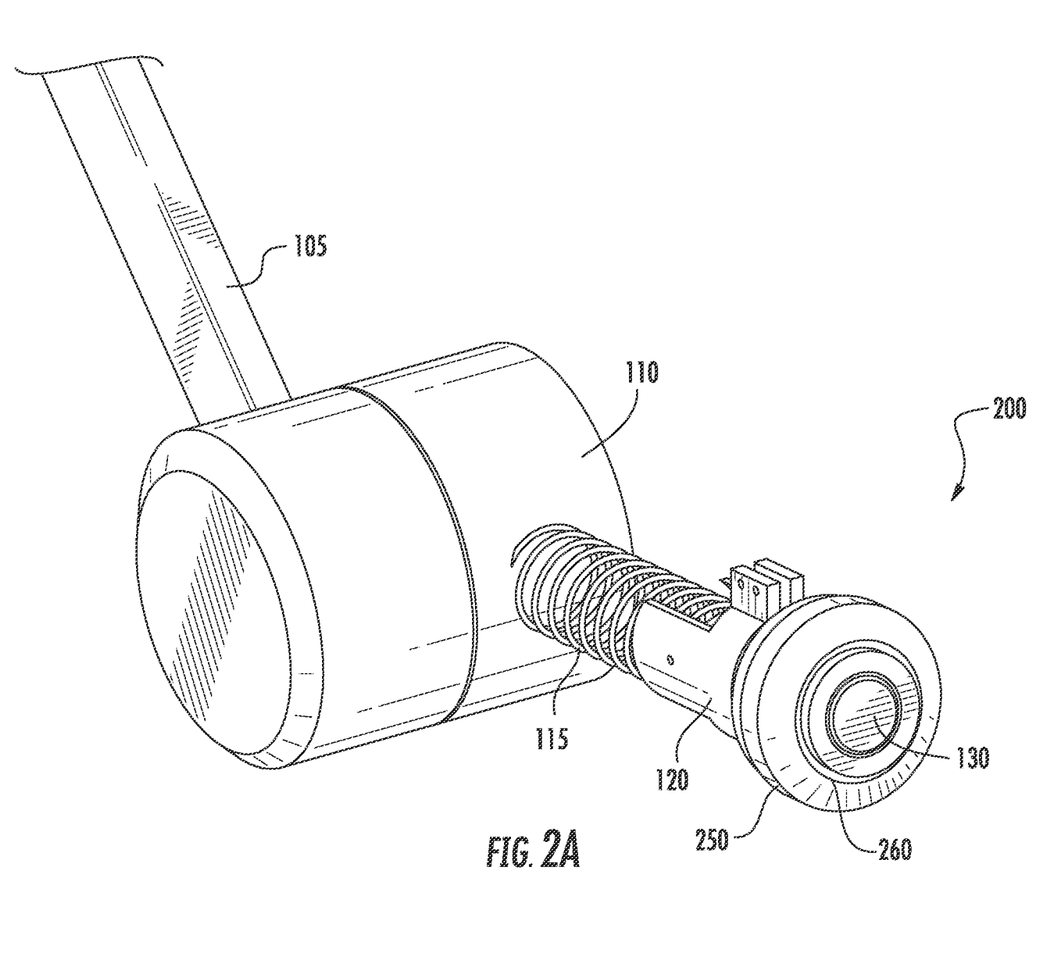
FIG. 2A illustrates a perspective view of a magnetically coupled integrated CP and UT probe system in accordance with an alternative embodiment of the present application.
Figure 2B:
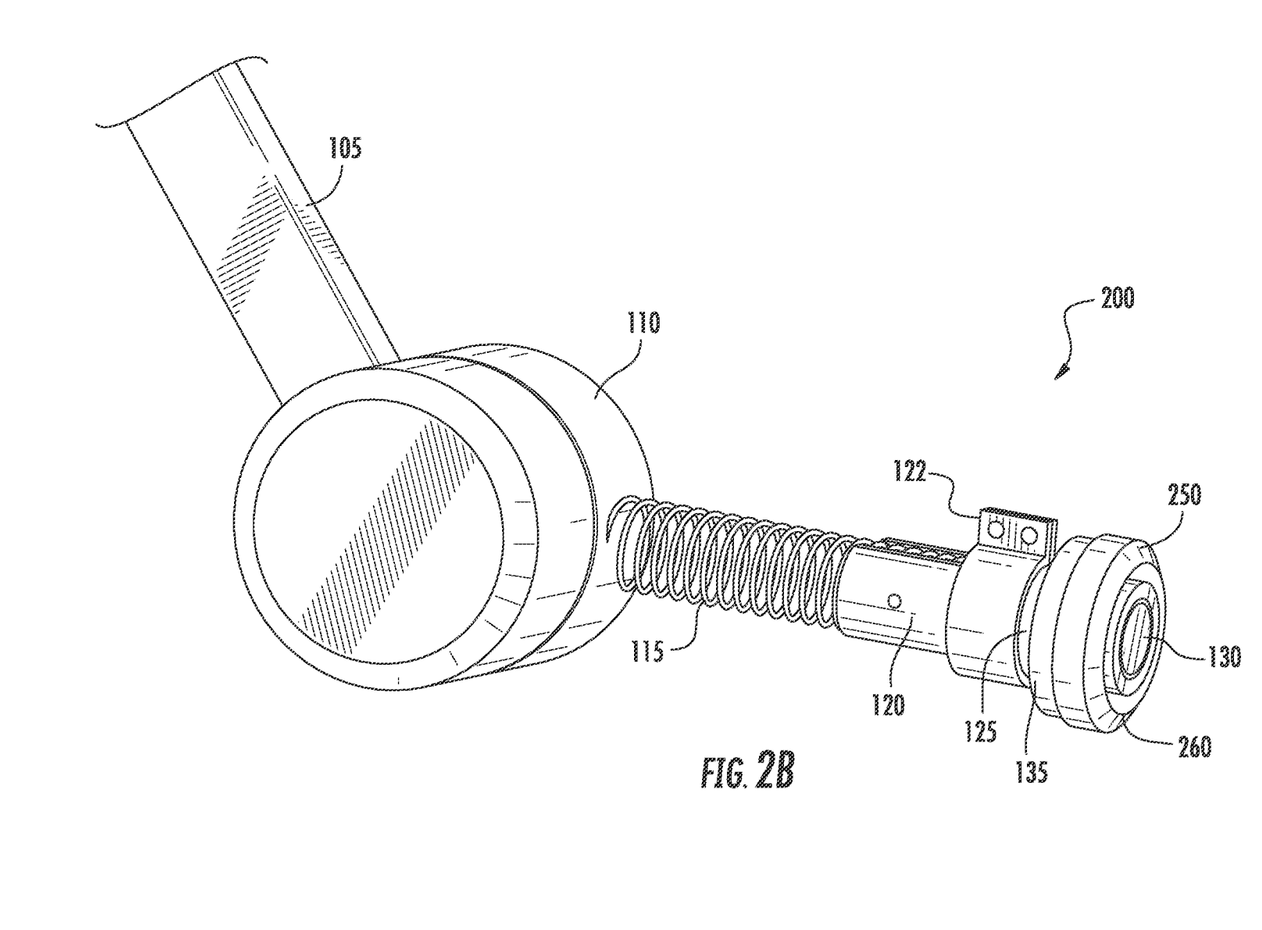
FIG. 2B illustrates an isometric side view of the alternative probe system of FIG. 2A.
Figure 2C:
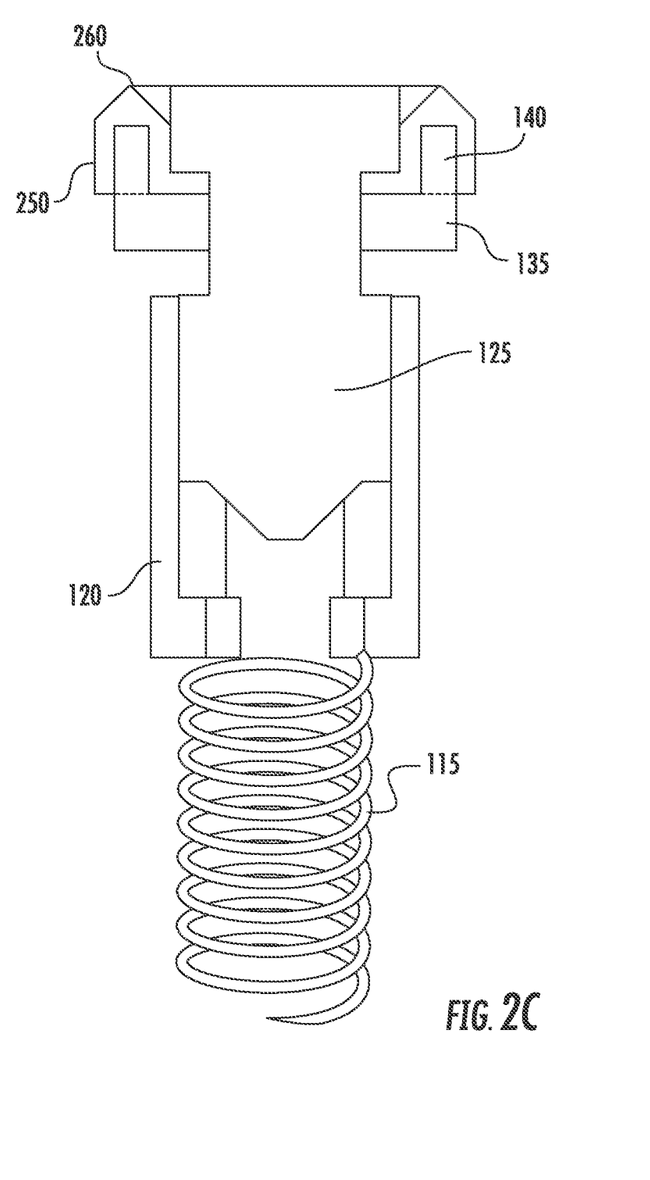
FIG. 2C illustrates a top cutaway view of the alternative probe system of FIG. 2A.

With reference now to FIGS. 2A-2C, a magnetically coupled integrated CP and UT probe system 200 in accordance with at least one embodiment of the present application is provided. Like the embodiment described with respect to FIGS. 1A-1C, integrated probe system 200 can be coupled to a ROV at an end effector 110 disposed at a robotic arm 105 in the same or similar manner and includes other similar coupling components. For example, integrated probe system 200 includes a sleeve housing 120 coupled to a spring 115, the sleeve housing surrounding a portion of an ultrasonic probe 125. In a particular embodiment, the sleeve housing 120 includes one or more upstanding ears 122 adapted to receive binding screws to secure the sleeve housing around the spring 115 and/or other component. However, the front surface (i.e., the surface oriented toward the inspection surface to be measured) of integrated probe system 200 replaces electrically conductive legs with an electrically conductive ring 250 having an aperture at the center of the ring to seat the flexible membrane 130 of the ultrasonic probe 125 in. The ring 250 includes conductive material that can act as a CP voltage probe similarly to conductive tips 152. In this way, the ring 250 performs the CP functions as performed by the gimbal 145 and the legs 150 of integrated probe system 100. The integrated probe system 200 has additional CP probe surface area, thereby increasing the chances of contact with the inspection surface for performing a CP voltage measurement. In one or more embodiments, the ring 250 has a smooth, flat outer surface. In other embodiments, the ring 250 includes serrated contact regions having conductive points. For example, the ring 250 can have jagged, saw-tooth like contact portions that are equidistant from the center of the flexible membrane 130, wherein each point of the serrated ring functions as a contact point for the CP voltage measurements.

In one or more embodiments, the entirety of the ring 250 is made of conductive material, such as, for example, a knurled ring made of stainless steel or other alloys. This ensures that a voltage measurement can be made wherever the integrated probe 200 touches the inspection surface. In one or more alternative embodiments, the outer surface (or "rim") of the ring 250 only includes conductive material. In one or more embodiments, the rim is located adjacent to the flexible membrane 130 such that when the membrane contacts the inspection surface, the rim contacts simultaneously. For example, FIG. 2A illustrates a rim 260 that includes conductive material along the entirety of the surface surrounding the flexible membrane 130. It should be understood from the preceding discussion that in embodiments in which the flexible membrane 130 extends beyond the rim 260, the flexible membrane can compress and thereby enable the rim 260 to make direct contact with an object in order to perform a CP measurement. In other embodiments, the rim 260 is spaced a distance from the flexible membrane 130 and tapers to a point that extends a small distance beyond the flexible membrane 130.

Figure 3:
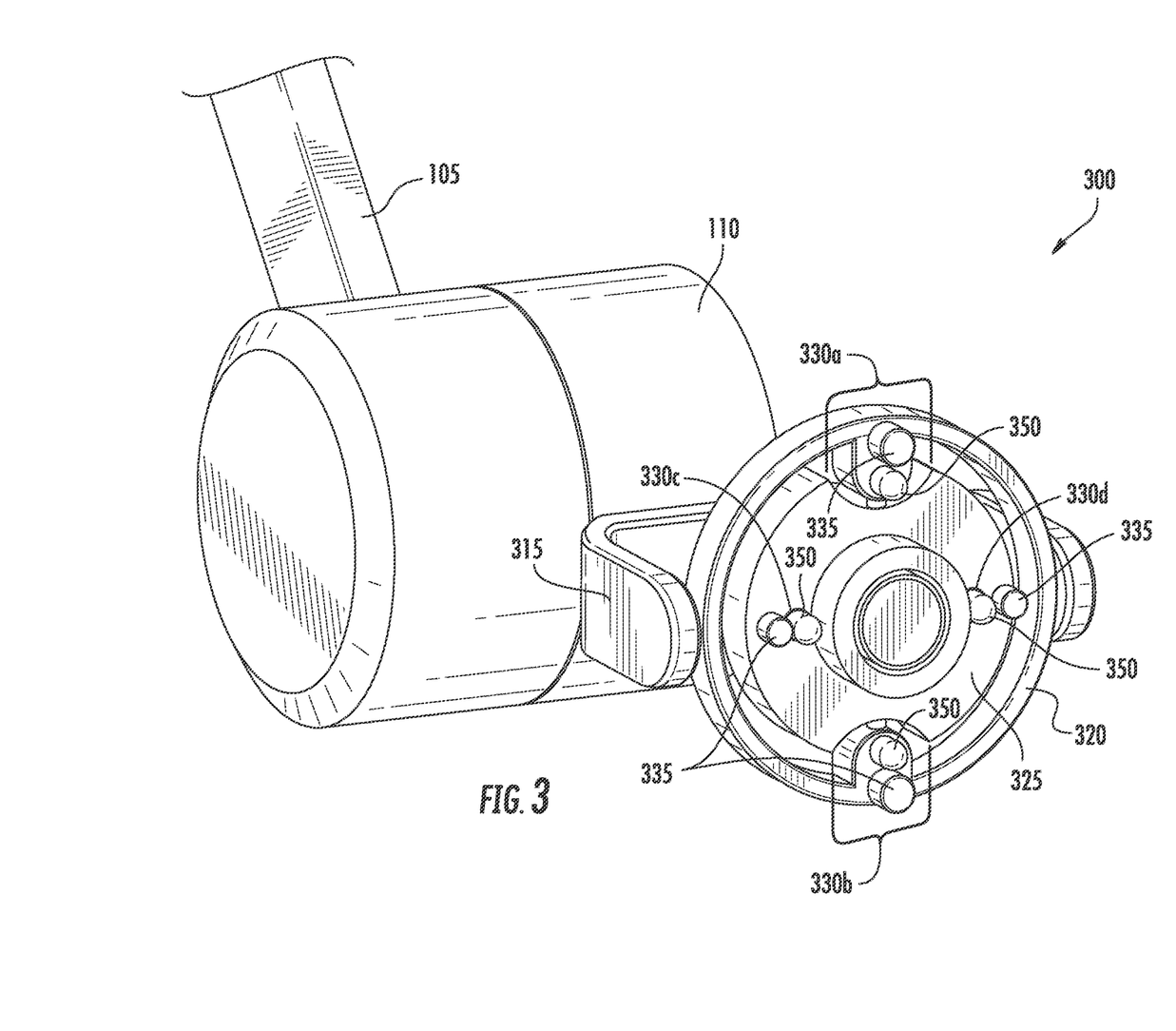
FIG. 3 illustrates a perspective view of a magnetically coupled integrated CP and UT probe system in accordance with another alternative embodiment of the present application.

With reference now to FIG. 3, a magnetically coupled integrated CP and UT probe system 300 in accordance with at least one embodiment of the present application is provided. In the exemplary embodiment, an array of articulated CP voltage probes (e.g., legs 150) are arranged around a UT probe (e.g., ultrasonic probe 125) in conjunction with one or more magnets arranged at the front surface of integrated probe system 300, thereby serving to align the UT probe within a certain margin by adhering the probe system transverse to the inspection surface.

As provided elsewhere herein, integrated probe system 300 can be coupled to a ROV at an end effector 110 disposed at a robotic arm 105. In the exemplary embodiment illustrated, integrated probe system 300 is coupled to the end effector 110 via a modular frame 315. Specifically, the modular frame 315 couples to system 300 at an outer gimbal 320, via screws, fasteners, or other conventional coupling means. In the exemplary embodiment, the modular frame 315 couples to the integrated probe system 300 at diametrically opposing points of the outer circumference of outer gimbal 320, thereby providing the outer gimbal with freedom of movement in a first plane.

The outer gimbal 320 is formed as a hollow ring with one or more coupling points at the inner surface of the outer gimbal. An inner gimbal 325 couples to the outer gimbal 320 at one or more of these coupling points via screws, fasteners, or other conventional coupling means. In one or more embodiments, the inner gimbal 325 is part of a probe carrier structure (e.g., gimbal 145). The inner and outer gimbals can be made of stainless steel or other alloy that is suitable for underwater inspection. In one or more embodiments, the outer gimbal 320 and inner gimbal 325 couple at a pair of diametrically opposed coupling points that are orthogonal to the points that couple the modular frame 315 to the outer gimbal 320. This provides the inner gimbal 325 with a freedom of movement in a second plane that is orthogonal to the freedom of movement of the outer gimbal 320. For example, if the outer gimbal 320 pitches forward and backward, the inner gimbal 325 can yaw side-to-side. More particularly, the outer gimbal 320 mechanically rotates forward and backward (i.e., a pitch motion) in one plane through an angle range (e.g., 0-10 degrees, 0-20 degrees), whereas the inner gimbal 325 mechanically rotates side-to-side (i.e., a yaw motion) through an angle range (e.g., 0-10 degrees, 0-20 degrees).

To facilitate the yaw movement of the inner gimbal 325, the inner gimbal can be molded to define one or more ingresses 330a, 330b, 330c, 330d (and more generally ingresses 330) for one or more electrically conductive legs 350 to pass through or around the circumference of the inner gimbal. Such electrically conductive legs 350 are similar or the same to legs 150. In one or more embodiments, the ingresses 330a, 330b are defined as indentations formed along a circumference of the inner gimbal 325 in a concave, rectangular, triangular, or other shape designed to facilitate the passive adjustment of legs 350. Indentation-type ingresses provide an avenue for inner gimbal 325 to rotate through, while still coupling the inner gimbal to the outer gimbal 320. In one or more embodiments, the ingresses 330c, 330d are defined as apertures formed through the narrow, crosswise width of inner gimbal 325. Integrated probe system 300 can also include a combination of indentation-type and aperture-type ingresses 330. In this way, different arrangements of the ingresses 330 and legs 350 defined by inner gimbal 325 can be contemplated that are more suitable for passively adjusting to a particular inspection surface.

One or more magnets 335 can be arranged and embedded into the front surfaces of the outer gimbal 320 or inner gimbal 325 such that when the integrated probe system 300 is brought into proximity with a ferrous inspection surface, the magnets can adhere the system to the surface, thereby orienting the CP and UT probes such that both measurements can be made substantially simultaneously. In one embodiment, four magnets are mounted at integrated probe system 300 and arranged to provide a magnetic pull force. In some embodiments, the magnetic pull force is 2 kgf or greater. Specifically, a first pair of magnets is diametrically arranged and extending longitudinally from the outer gimbal 320 in a direction perpendicular to the outer circumferential surface of the outer gimbal (i.e., in the plane facing toward the inspection surface). A second pair of magnets is diametrically arranged and extending longitudinally from the inner gimbal 325, also in the inspection plane facing toward the inspection surface. An electrically conductive leg is adjacent to each magnet, such that when the front surface of the integrated probe system 300 is in proximity with the inspection surface, the magnets 335 attract to the surface, which pulls the electrically conductive legs 350 toward the surface until the tips make contact.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application should not be limited by any of the above-described example implementations.

What is claimed:

1. An integrated probe suitable for performing cathodic protection (CP) voltage readings and ultrasonic testing (UT) thickness measurements at an underwater surface at the same time, comprising:
   a CP probe having three or more electrically conductive tips disposed at a periphery of a front surface of the CP probe, the electrically conductive tips being configured to perform the CP voltage readings of the underwater surface while contacting the underwater surface;
   one or more magnets embedded within the CP probe and generating a magnetic field;
   a flux concentrator embedded within the CP probe, configured to direct the magnetic field towards the front surface of the CP probe for magnetic attachment of the front surface of the CP probe to the underwater surface during the CP voltage readings and the UT thickness measurements of the underwater surface at the same time, supported by the one or more magnets, and adjacent to the electrically conductive tips;
   a flexible membrane seated in a center of the front surface of the CP probe, the electrically conductive tips being arranged about the flexible membrane;
   a sleeve housing;
   an ultrasonic probe for performing the UT thickness measurements of the underwater surface at the same time as the electrically conductive tips contact the underwater surface and perform the CP voltage readings, the ultrasonic probe having a transducer crystal, the ultrasonic probe being partially disposed within the sleeve housing and extending through the center of the CP probe to be adjacent to the flexible membrane, the flexible membrane being arranged about the transducer crystal; and
   a spring coupled to a free end of the sleeve housing and configured to provide two degrees of freedom to the CP probe in response to a force imparted when the electrically conductive tips contact the underwater surface.

2. The integrated probe system according to claim 1, wherein the electrically conductive tips are arranged equidistant from one another about the flexible membrane.

3. The integrated probe system according to claim 1, wherein the electrically conductive tips comprise exactly three electrically conductive tips.

4. The integrated probe system according to claim 1, wherein the flux concentrator is a ring-shaped layer of magnetically conductive material.

5. The integrated probe system according to claim 1, wherein the flux concentrator comprises one or more magnetically conductive rods embedded within the CP probe.

6. The integrated probe system according to claim 1, wherein the flux concentrator is made of iron.

7. The integrated probe system according to claim 1, wherein the sleeve housing is a hollow, cylindrically-shaped tube.

8. The integrated probe system according to claim 1, further comprising a couplant disposed within a gap between the flexible membrane and the transducer crystal.

\* \* \* \* \*

UNITED STATES PATENT AND TRADEMARK OFFICE
CERTIFICATE OF CORRECTION

PATENT NO. : 11,761,758 B2
APPLICATION NO. : 17/214070
DATED : September 19, 2023
INVENTOR(S) : Fadl Abdellatif et al.

It is certified that error appears in the above-identified patent and that said Letters Patent is hereby corrected as shown below:

On the Title Page

Item (72), Line 1, the first inventor:
"Fadi Abdellatif"

Should read:
Fadl Abdellatif

Signed and Sealed this
Thirty-first Day of October, 2023

Katherine Kelly Vidal
*Director of the United States Patent and Trademark Office*